United States Patent [19]
Nolte

[11] Patent Number: 5,660,266
[45] Date of Patent: Aug. 26, 1997

[54] POCKET BELT CONVEYOR

[75] Inventor: Günther Nolte, Moers, Germany

[73] Assignee: Conrad Scholtz GmbH, Hamburg, Germany

[21] Appl. No.: 367,351

[22] PCT Filed: Jul. 14, 1993

[86] PCT No.: PCT/EP93/01848

§ 371 Date: Jan. 13, 1995

§ 102(e) Date: Jan. 13, 1995

[87] PCT Pub. No.: WO94/02391

PCT Pub. Date: Feb. 3, 1994

[30] Foreign Application Priority Data

Jul. 17, 1992 [DE] Germany ............ 42 23 634.7

[51] Int. Cl.⁶ .................................................. B65G 17/04
[52] U.S. Cl. ........................ 198/711; 198/715; 198/701
[58] Field of Search ................................. 1998/701, 707, 1998/709, 711, 713, 714, 715; 414/141.1, 141.2, 142.5, 327

[56] References Cited

U.S. PATENT DOCUMENTS

| | | | |
|---|---|---|---|
| 2,828,002 | 3/1958 | Sawrie | 198/715 |
| 3,603,447 | 9/1971 | Pott | 198/711 |
| 3,750,864 | 8/1973 | Nolte | 198/707 |
| 4,019,625 | 4/1977 | Wiese | 198/715 X |
| 4,177,891 | 12/1979 | Delfosse | 198/713 X |
| 4,333,561 | 6/1982 | Schlegel | 198/713 X |
| 4,410,080 | 10/1983 | Gram | 198/715 |
| 4,440,537 | 4/1984 | Blättermann et al. | 414/141.1 |

FOREIGN PATENT DOCUMENTS

| | | | |
|---|---|---|---|
| 0547215 | 5/1956 | Belgium | 198/715 |
| 9 66 618 | 5/1956 | Germany . | |
| 1 080 480 | 11/1960 | Germany . | |
| 18 29 977 | 12/1960 | Germany . | |
| 1228190 | 11/1966 | Germany | 198/715 |
| 1 263 591 | 3/1968 | Germany . | |
| 66 03 142 | 9/1968 | Germany . | |
| 1 756 905 | 10/1973 | Germany . | |
| 28 35 350 | 2/1979 | Germany . | |
| 36 36 833 | 4/1987 | Germany . | |
| 3641964 | 10/1987 | Germany | 198/715 |
| 38 02 078 | 7/1989 | Germany . | |
| 38 37 115 | 5/1990 | Germany . | |
| 38 35 619 | 11/1990 | Germany . | |
| 3928166 | 3/1991 | Germany | 198/715 |
| 94 681 | 10/1996 | Germany . | |
| 0118611 | 7/1984 | Japan | 198/715 |
| 1075851 | 7/1967 | United Kingdom | 198/715 |

*Primary Examiner*—James W. Keenan
*Attorney, Agent, or Firm*—Bell, Seltzer, Park & Gibson, P.A.

[57] ABSTRACT

A pocket belt conveyor is indicated which comprises an endless traction member (1) guided around drive pulleys (2), deviator pulleys (4), and deflection pulleys (6) and including at least two spaced apart supporting belts (8, 10) having between them a plurality of mutually spaced transverse members (12) secured at their ends on the supporting belts (8, 10). Pockets (48) are suspended between the transverse members (12), they each comprise a bottom wall (24) made of rubber or a rubber-like material. Each transverse member (12) has a planar fastening face (21) which serves for attachment of the bottom wall (24) and extends at an angle with respect to the plane of the supporting belt. This predetermined oblique arrangement of the pockets (48) makes sure that bulk material will be received and discharged properly.

18 Claims, 10 Drawing Sheets

POCKET BELT CONVEYOR

FIELD OF THE INVENTION

The instant invention relates to a pocket belt conveyor comprising an endless traction member guided around drive pulleys, deviator pulleys, as well as deflection pulleys and including at least two spaced apart supporting belts having between them a plurality of mutually spaced transverse members, further comprising pockets each formed with a bottom wall made of rubber or a rubber-like material and extending between two adjacent transverse members.

BACKGROUND OF THE INVENTION

Such a pocket belt conveyor is known from DE 38 37 115 A1, DE-PS 966 618, and DE 66 03 142 U. In the case of the pocket belt conveyors, so-called inside conveyors, known from the first two publications the bulk material is supplied and discharged at the inside of the revolving traction member. The latter comprises supporting belts which are spaced apart and to which transverse members are fixed by retainer means. Inwardly open pockets formed by an endless band are arranged between the supporting belts. The edges of the pockets each are connected firmly to a sidewall which is made of stiff material, whereby the sidewalls act as backing elements of the pocket giving it its shape. The pocket belt conveyor according to DE 38 37 115 A1 has its adjacent transverse members interconnected at their ends by fishplates in such a way that the transverse members and the fishplates together form an articulated sidebar chain connected parallel to the supporting belts and revolving together with them. This arrangement of the pockets with respect to the traction member and the provision of an additional sidebar chain results in a complex and expensive structure of the pocket belt conveyor, as reflected by the greater susceptibility to repair and higher manufacturing cost. Furthermore, sidewalls of stiff material are needed to keep the bottom wall of the pockets in an inclined position with respect to the traction member. The pocket belt conveyor according to DE 66 03 142 U, on the other hand, has no sidewalls at all but instead only flexible pockets which are fastened to transverse members in the form of rods. This known pocket belt conveyor, above all, has the disadvantage that its simple structure, especially the simple way of fastening the transverse members at the supporting belts, makes it unsuitable for use with heavy goods. Experience made with pocket belt conveyors and the more sophisticated requirements to be met in terms of uninterrupted service life have led to new approaches in the design and fastening of pockets in pocket belt conveyors so as to obtain a conveyor belt which, on the whole, is more reliable and suitable for an extreme range of applications.

DE 38 35 619 C2 discloses a normal conveyor belt with a plurality of studded feet which are fixed by their studs on the basic belt so as to extend transversely of the conveying direction and entrain the goods to be conveyed in conveying direction. A mesh fabric is suspended between adjacent studs so as to extend from the tip of one stud to the root of the preceding stud in the direction of conveyance. A fastening rail serves to secure the fabric to the root of the stud and, by this rail, each mesh fabric is fastened indirectly, through the root of the stud, to the basic belt. With this known conveyor belt it is the studs that carry the mesh fabric provided between them and fixed to them. The pockets of a pocket belt conveyor, on the other hand, are suspended directly from the supporting belts and that requires high standards to be met, especially as regards the pockets themselves and their fastening to the supporting belts. Also, the direct fixing of the pockets at the supporting belts means that the pockets are subjected to greater stress than the mesh fabrics which are suspended between the studs of the known conveyor belt when the supporting belts revolve around the drive pulleys or the deviator and deflection pulleys.

DE-AS 12 63 591 discloses a bucket conveyor whose "fastening element" forms part of the pocket (in that case called "bucket") which is made up of a rigid rear portion and a flexible front portion. The only thing comparable to the transverse member of the instant pocket belt conveyor is a transverse bar, the design of which, however, differs from that of the transverse member.

DE 18 29 977 U relates to a pocket belt conveyor with which the recipient bottom is made of a non-flexible material, namely sheet steel, and the planar portion tapering so as to form a pivot pin is made of sheet steel and extends at an angle to the travelling plane of the pivot pins.

DE 38 02 078 describes a pocket belt conveyor comprising upper and lower sprockets and an endless chain moving around them. Pockets are fixed to the chain by means of support frames. Each pocket is formed so as to have sidewalls of reinforced rubber as well as a wall interconnecting the sidewalls and made of transversely stiff cloth. The combination of reinforced sidewalls and transversely stiff cloth provides a pocket of relatively stable configuration which is inclined with respect to the traction member, the pockets being lined up uninterruptedly. The upper, rear edge of the bottom wall of one pocket is bent at the level of the transverse members so as to extend over the lower, front edge of the adjacent pocket. Here the contiguous edges of the adjacent pockets are glued or screwed together.

Finally, the traction member of the pocket belt conveyor known from DE 1 080 480 comprises transverse webs which are reinforced by inserts. Each one of the pockets which are positioned so as to be mutually spaced on the traction member is secured between two adjacent transverse webs. To this end the flexible bottom wall of the pockets is extended all the way to the region of the transverse webs and secured to them. The pockets are defined laterally by sidewalls the shape of which is stiff. The pockets are in an oblique position, as determined by the stiff sidewalls, with respect to the revolving endless traction member.

The problem underlying the instant invention was to improve a pocket belt conveyor of the kind known from DE 66 03 142 U so that it would be distinguished by greater efficiency.

SUMMARY OF THE INVENTION

That object is met, with a pocket belt conveyor of the kind specified initially, in that the transverse members have a planar fastening face which serves for attachment of the bottom wall and extends at an angle with respect to the plane of the supporting belt. The flexible bottom wall of the pocket attached to the fastening face thus becomes aligned so as to present a continuation of the fastening face, thereby guaranteeing that bulk material is securely passed into the pocket. It is essential especially that the alignment of the pockets determined by the fastening face, i.e. the inclination of the pockets with respect to the supporting belt plane makes it possible to do without either sidewalls which determine the shape or stiff sidewalls of the pockets. Additionally, the fastening face also serves as a guide face for the bulk material. The degree of inclination of the fastening face with respect to the traction support plane can be selected in accordance with the particular case. The pocket belt conveyor according to the invention thus is of simple structure and comprises but a few components. High stability is achieved as well as smooth running of the pocket belt conveyor with little wear since the components do not carry out any relative motion with respect to one another and no joints are required.

Advantageous modifications of the invention are indicated in the subclaims.

For example, the cross section of the transverse members may be triangular, preferably being an isosceles, right-angled triangle. This configuration results in inclined guide surfaces at either side for the bulk material, thus enabling uniform, safe filling of the bulk material into the interior of the pockets which are lined up without any gaps in between. In this case, too, the angle of inclination can be adapted to the respective case at issue. This design further warrants that the bulk material does not remain on any surface areas between individual pockets. The triangular transverse members may cooperate either with drive pulleys or with deflection pulleys, depending on the design of the pocket belt conveyor, and those pulleys are formed with corresponding recesses. Or they may cooperate, preferably, only with deviator pulleys of corresponding configuration so that the drive as such will remain entirely a friction drive. While, in the first case, the transverse members are arranged at the contact side of the supporting belts, they are located at the carrying side of the supporting belts, in the preferred second embodiment, thus assuring synchronized running of the two separate supporting belts by their cooperation with the cut-out deviator pulleys.

In further modification of the conveying means according to the invention the transverse members may have different cross sectional configurations along their length. While the cross sectional shape between the supporting belts may continue to be that of a triangle whose hypotenuse presents the attachment face for securing the bottom wall, the cross sectional shape of the transverse members at the location of their attachment to the supporting belts is selected such that they will rest with the greatest possible surface area on the supporting belts. An additional aspect in selecting the cross sectional configuration of the transverse members in the area of the supporting belts, is that those are the sections in which the transverse members suffer particular stress when the supporting belts travel around one of the pulleys.

As an alternative or additional modification, preferably, the ends of the transverse members are designed as journals which are rotatably supported in journal bearings mounted on the supporting belts. As these journal bearings become compressed and stretched when they revolve around the pulleys and in view of the fact that such deformations might affect the bond between the journal bearings and the supporting belts, each bearing preferably is formed not only with a bore to receive the journal of a transverse member but also with additional apertures which are located in the region between the bore and the underside of the journal bearing. These additional apertures advantageously absorb the twisting forces that are generated during movement around one of the pulleys for driving, deviating or deflecting the belt. This measure effectively reduces the forces which act on the underside of each journal bearing and tend to separate the journal bearing from its supporting belt when the belt travels around the pulleys.

The transverse members preferably are made of rubber or a rubber-like material provided with some kind of reinforcement. This provides exceptionally smooth running of the pocket belt conveyor. The reinforcement may be embodied by individual steel cords and/or a centrally disposed steel tube. To further achieve a stable composite structure whose components do not move with respect to each other, the transverse members preferably are cemented in their end zones to the spaced apart supporting belts which likewise are made of rubber or rubber-like material. It is also conceivable, of course, that both the transverse members and the supporting belts or one or the other are made of suitable plastics.

In further modification, fastening means for the pocket may be provided at the fastening face, these being designed especially as U-shaped screw bolts for detachable mounting of the pockets. This means that an individual pocket may be replaced, irrespective of the others, if need be.

Further improvement of the strength of the overall assembly and a desirable alignment of the pocket sidewalls is achieved by grooves formed in the fastening face for the bottom wall to receive the sidewalls of the pockets. The pockets preferably are U-shaped in cross section, the bottom wall featuring transverse stiffness and the sidewalls between which the bottom wall is disposed acting as backing elements which give shape to the pockets. Assembly is facilitated by the way in which the bottom walls of adjacent pockets are superpositioned and attached to the fastening face.

Another solution of the problem underlying the instant invention in the connnection with a pocket belt conveyor of the type specified initially is indicated by way of a special design of the sidewalls of the pockets: the pocket sidewalls comprise at least two different folded portions extending at different sides of the traction member, i.e. at the contact side and the carrying side. This division into two different folded portions contributes greatly to a reduction of wear since those parts of the sidewalls which are located at the contact side of the traction member become compressed as the belt revolves around the drive or deflection pulleys, while other parts of the sidewalls at the other side, the carrying side, become stretched.

Preferably, a first folded portion located at the contact side of the traction member is designed like a fan, and a second folded portion at the carrying side of the traction member is corrugated in parallel with the traction member. This corrugation of the second folded portion, for instance, may be of sawtooth shape. The corrugation permits the pockets to be compressed in radial direction, and the asymmetrical corrugation facilitates the emptying of the bulk material in the sense that no bulk material will stick to the inside of the pockets. This design of the sidewalls makes it possible for the pockets to adapt especially well to the resulting curvature in the plane of the supporting belt upon movement around the pulleys.

In further modification, the pocket includes folds parallel to the edges, as an alternative or in addition. In this manner any shortening or compression reaching down below the plane of the traction member is accommodated. Preferably, the folds which extend around the edges can be made so that a lip results at the very edge, for the bottom of the pocket to be attached to by gluing in overlapping surface contact relationship.

Moreover, the pocket may include an end piece of rubber or rubber-like material which is vulcanized to the bottom wall and preferably strengthened by steel reinforcements. In assembled condition of the pocket, this end piece lies on the fastening face of the transverse member. The reinforcement strengthens the stability in this area, preventing in particular any bending.

Particularly good guidance of the bulk material is achieved by having the end piece of the pocket project above the transverse member, when fixed in position. Moreover, in this manner the projecting end piece shields the corresponding transverse member so that direct contact is avoided between the transverse member and the bulk material. The projecting end piece, of course, also protects the end surface of the transverse member.

In accordance with the respective embodiment of the pocket belt conveyor, either the drive pulleys and the deviator pulleys are formed with recesses in their circumference to receive the journal bearings or the ends of the transverse members, in which case both the drive pulleys and the deviator pulleys make sure that the supporting belts travel in synchronism, or the deflection pulleys alone have recesses in their circumference to take up the journal bearings or ends of the transverse members, thus taking care of the necessary synchronization.

In practice, when operating a conveyor belt, it will not be possible to prevent a certain degree of slip of the supporting belts with respect to either the drive, deviator, or deflection pulleys. As a consequence of such slippage, the transverse members or the journal bearings in which the transverse members are held will no longer fit exactly into the recesses formed in the pulleys. Instead they will increasingly meet with a pulley segment located between two adjacent recesses. To avoid that, the pulley segments preferably are designed to be radially adjustable. By radial adjustment of the pulley segments, the circumference of the pulley is varied so that engagement of the transverse members or journal bearings in the recesses can be reestablished, and thus the slip is corrected. In this manner it is prevented that the transverse members or the journal bearings holding them will transmit the drive force from the drive pulleys to the traction member, a task which neither the transverse members nor the journal bearings could withstand.

BRIEF DESCRIPTION OF THE DRAWINGS

Two embodiments of the invention will be described further below, with reference to a drawing in which.

DETAILED DESCRIPTION OF THE PREFERRED EMBODIMENT

Figure 1:
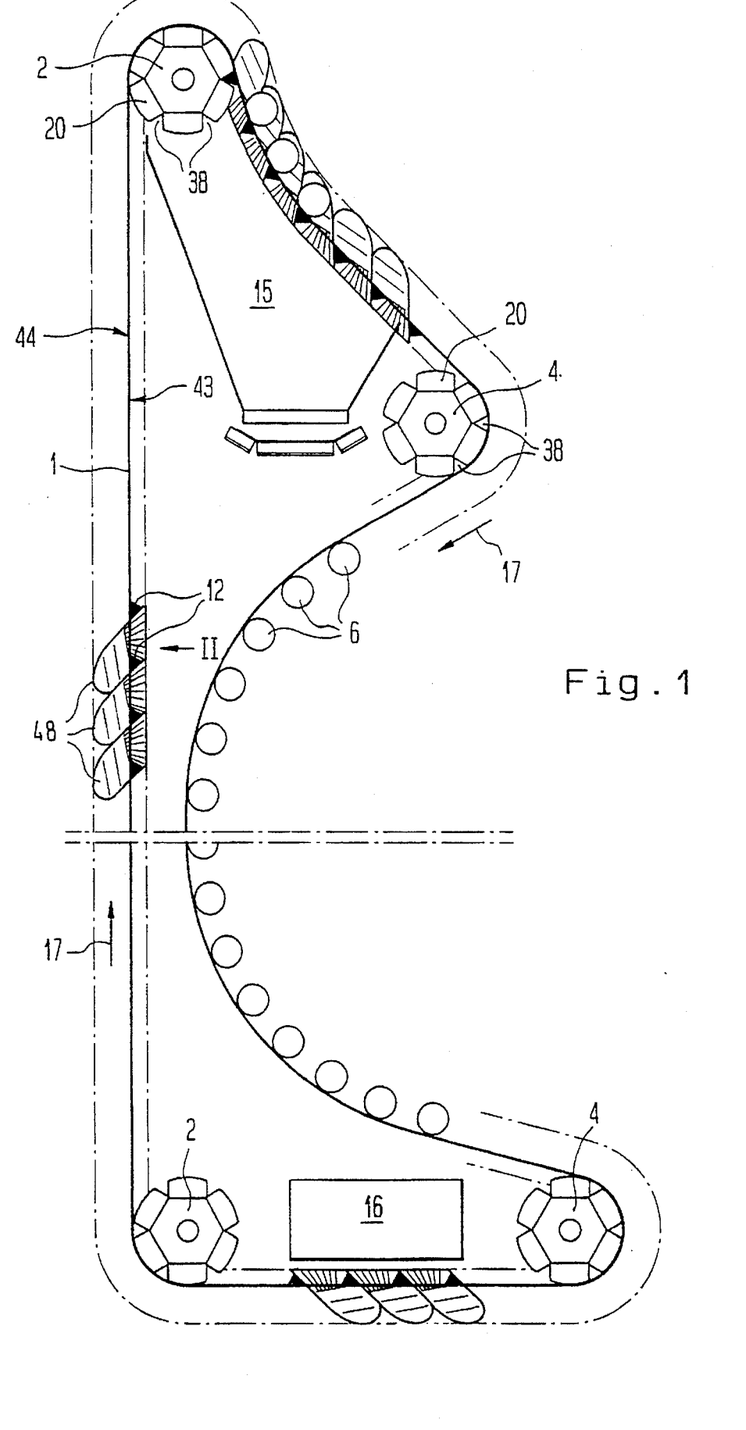
FIG. 1 is a diagrammatic side elevational view of a first embodiment of a pocket belt conveyor according to the invention.

FIG. 1 is a diagrammatic side elevational view of a first embodiment of a pocket belt conveyor according to the invention. Essentially, the conveyor consists of an endless traction member 1 which is guided in a loop in the direction of arrows 17 around upper and lower drive pulleys 2, upper and lower deviator pulleys 4, and quite a number of deflection pulleys 6. Furthermore it comprises a plurality of pockets 48 secured one after the other to the traction member 1 so as to receive bulk material at a feeder chute 16 and deliver it at a discharge chute 15. The deflection pulleys 6 in this case have the task of bringing the return run of the traction member 1 as close as possible to the forward run thereof so that, for instance, their joint transportion through a tunnel will be possible or at least the forward and return runs will require only a relatively narrow conveyance route. The diagrammatic presentation is shown to be discontinuous below the three pockets 48 which form part of the forward run in order thus to demonstrate the joint guidance of the forward and return runs along a narrow route over great distances.

The traction member 1 consists of two parallel supporting belts 8, 10 (cf. FIGS. 2 and 3) which are spaced apart and between which transverse members 12 are positioned at regular spacings, having their ends 41, 42 attached to the supporting belts 8, 10. The transverse members 12 in turn carry pockets 48 sagging between the two supporting belts 8, 10. In this embodiment the drive pulleys 2 and the deviator pulleys 4 have recesses 38 distributed around their peripheries and formed between pulley segments 20 in order to take up the ends 41, 42 of the transverse members 12 as the traction member 1 revolves. The transverse members 12 of this embodiment are located at the contact side 43 of the traction member 1 or of the supporting belts 8, 10 and the deflection pulleys 6 act only upon the carrying side 44 of the traction member 1. For this reason the latter pulleys have a smooth peripheral surface, i.e. they are not formed with recesses. The engagement of the transverse members 12 in the recesses 38 of the drive pulleys 2 and deviator pulleys 4, in the first place, serves to establish synchronized travel of the two supporting belts 8, 10 which otherwise are independent of each other, rather than to drive the traction member 1. It is to be avoided as best as possible to have the traction member 1 driven by the drive pulleys 2 in the fashion of a sprocket drive because, in operation, the shearing forces acting on the transverse members 12 as they travel around the drive pulleys 2 would lead to the destruction or separation of the transverse members 12 from the supporting belts 8, 10 due do the driving force of the pulleys.

Figure 2:
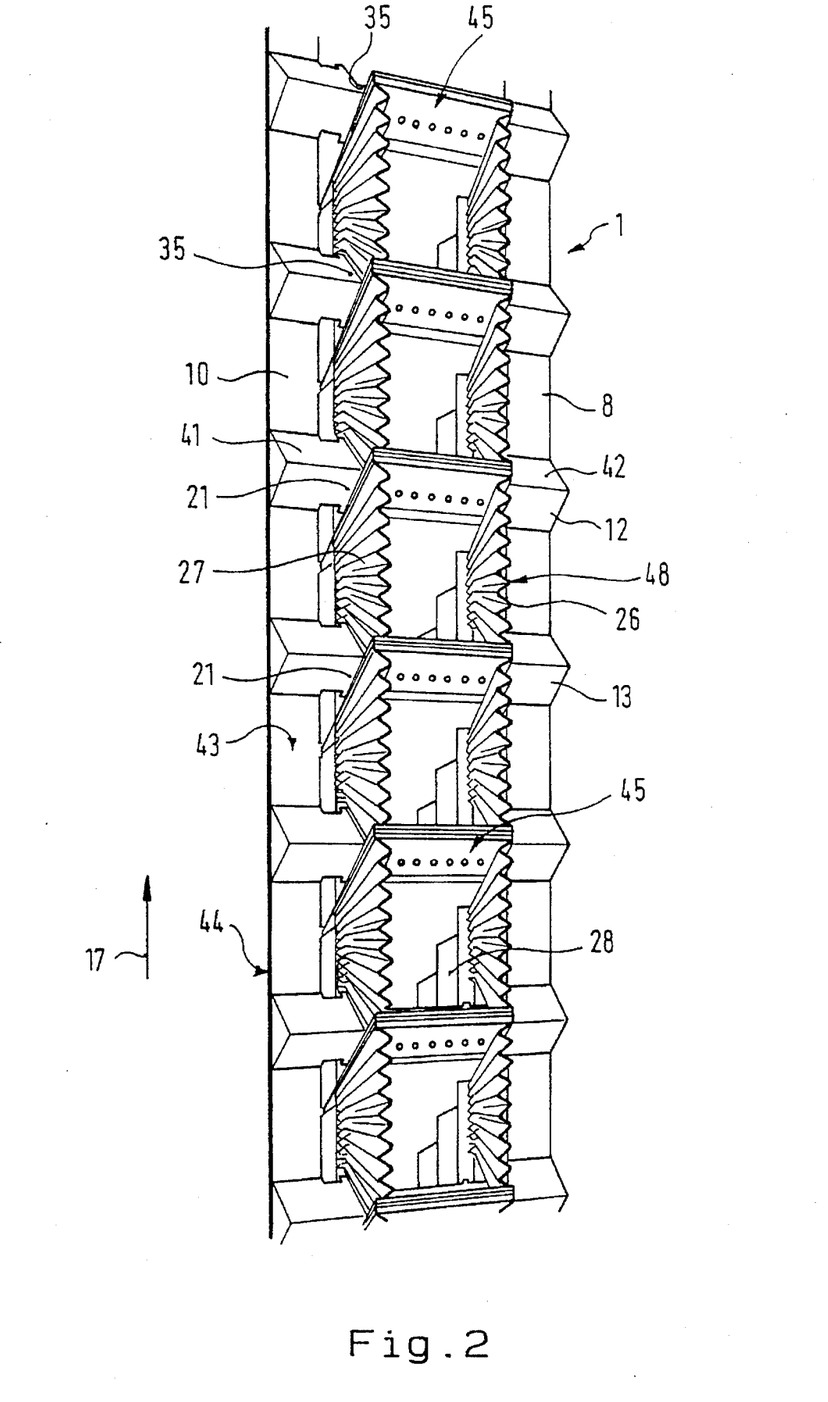
FIG. 2 is a perspective top plan view of part of the pocket belt conveyor as seen in the direction of arrow II in FIG. 1.

FIG. 2 shows a cutout in perspective of the pocket belt conveyor illustrated in FIG. 1, seen in the direction of arrow II. This presentation demonstrates one of the possible basic forms of transverse members 12 which in this case are triangular in cross section. In this embodiment the ends 41, 42 of the transverse members 12 have a larger cross sectional surface area than the portion of the transverse members 12 which is located between the supporting belts 8, 10 as this permits the ends 41, 42 to be vulcanized or cemented to the supporting belts 8, 10 with the greatest possible hypotenuse surface area. One pocket 48 each is suspended between two adjacent transverse members 12, 13, and the front end 45 in conveying direction 17 is attached to a planar fastening face 21 of a transverse member 12, while the rear end 46 (cf. FIGS. 3 and 4) in conveying direction 17 is attached to a planar fastening face 21 of the next successive transverse member 13. The filling cross section of each pocket 48 is restricted as little as possible in that the triangular surface of the transverse member 12 opposite the planar fastening face 21, namely the guide surface 35 in the region between the supporting belts 8, 10, is formed merely as a web, whereby the transverse member 12 is given the reduced cross section already mentioned between the supporting belts 8, 10. The supporting belts 8, 10 preferably are made of rubber or a rubber-like material incorporating steel cords for reinforcement purposes, and they have a narrow rectangular cross section. Preferably also the transverse members 12 are made of rubber or rubber-like material including reinforcing means 22, 36 which will be dealt with again below in the description of FIGS. 6 and 7. But also FIG. 2 illustrates that the sidewalls 26 of the pockets 48 have different folds at the contact side 43 of the supporting belts 8, 10 than at the opposite carrying side 44. The first folded portion 27 located above the contact side 43 is shaped like a fan, while the second folded portion 28, to be seen only at the right and located at the carrying side 44, is formed with corrugations parallel to the traction member 1.

Figure 3:
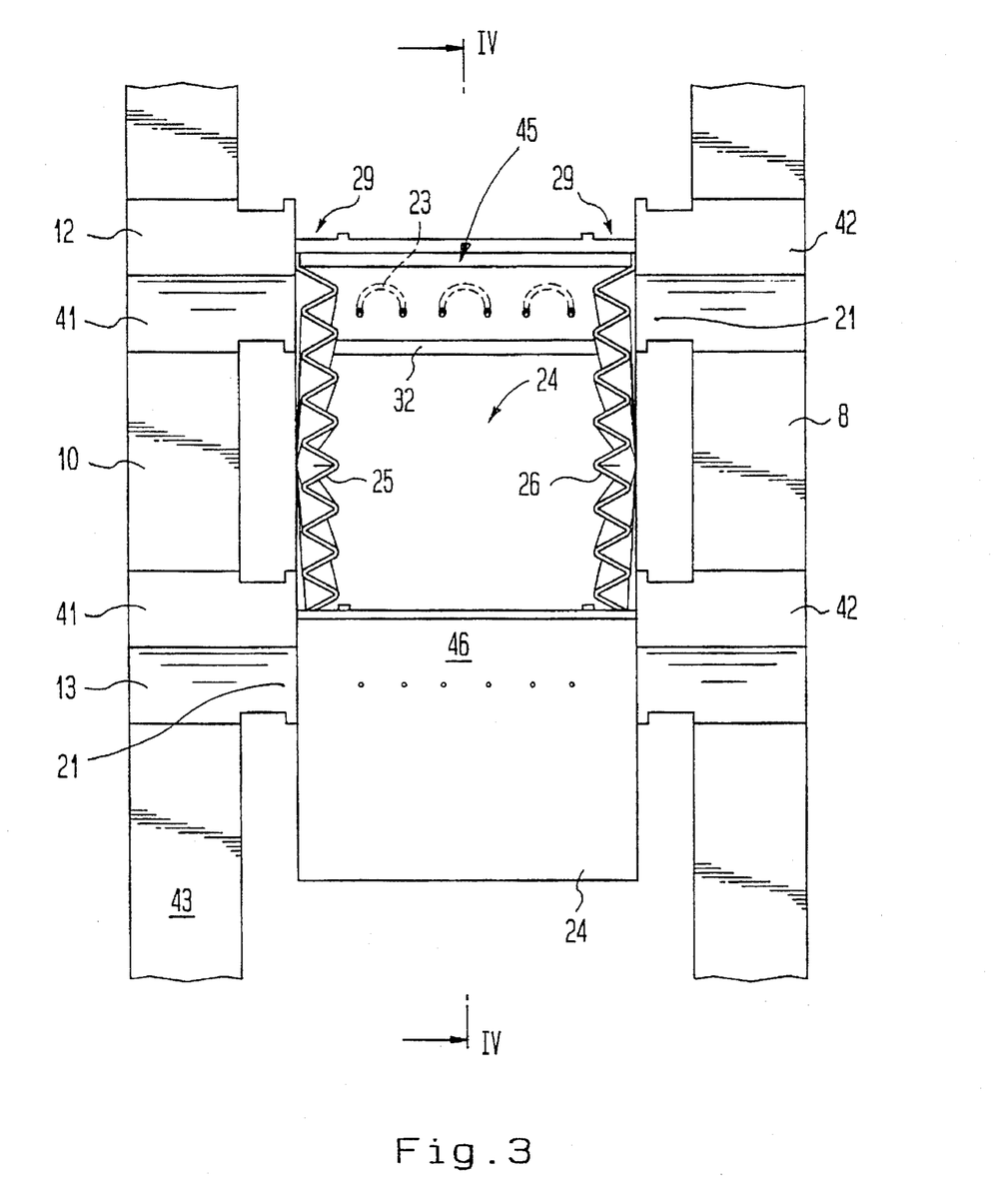
FIG. 3 is a top plan view of a pocket mounted on the traction member.

FIG. 3 shows a single pocket 48 according to FIG. 2 in top plan view. This presentation makes it clear in particular that the configuration of the transverse members 12, in their longitudinal extension, is different between the two supporting belts 8, 10 than at their ends 41, 42 in the area of the supporting belts 8, 10 themselves. The pockets 48 which are approximately U-shaped in cross section and all designed alike have a bottom wall 24 and the sidewalls 25, 26 already mentioned which are adapted to be folded. The bottom wall 24 is transversely stiff, a property which can be obtained, for instance, by a reinforcing means incorporated in it. The transverse members 12 are formed with grooves 29 to receive the sidewalls 25, 26, the width of the grooves corresponding to the width of the first folded portion 27.

Figure 4:
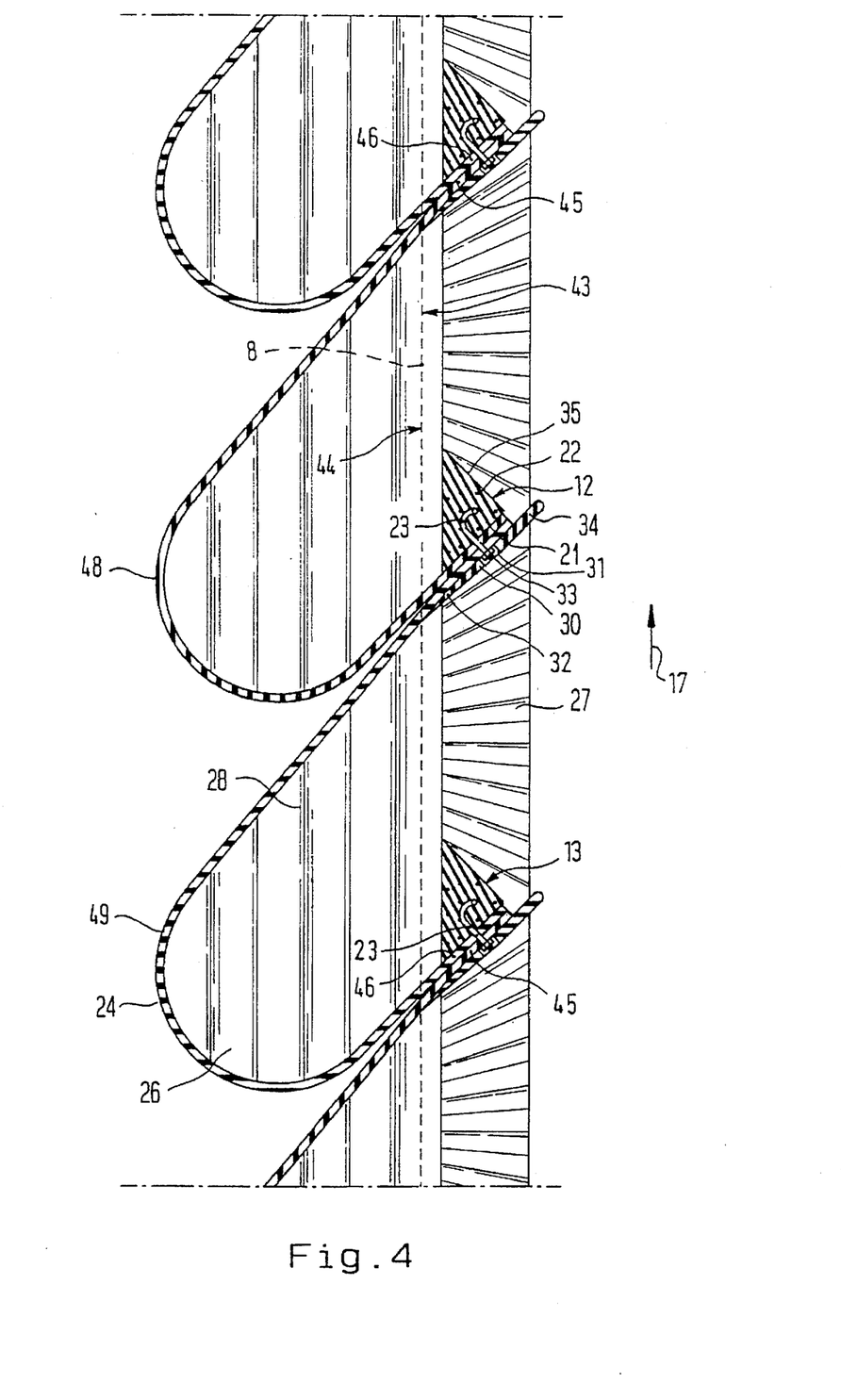
FIG. 4 is a sectional elevation along line IV—IV in FIG. 3.

FIG. 4 is a longitudinal section along line IV—IV in FIG. 3 demonstrating once again that, with this embodiment, the cross sectional shape of the transverse members 12, 13 is that of a triangle, particularly an isosceles, right-angled triangle.

While the hypotenuse of the triangle is fastened on the supporting belt 8, one side surface of the transverse members 12, 13 presents the flat fastening face 21 for attachment of the pockets 48. This fastening face 21 is inclined with respect to the traction member 1 or the plane defined by the supporting belts 8, 10 so as to form an angle with this plane. This angle is 45° in the embodiment illustrated. As already mentioned, the transverse members are made of rubber or a rubber-like material into which steel reinforcements 22, 36 have been vulcanized to increase their strength. Likewise incorporated by vulcanization are screw bolts 23, 37 which project vertically from the fastening face 21 and serve for attachment of the pockets 48. The angle of inclination of the pockets 48 with respect to the plane of the supporting belts is determined by the angle included between the fastening face 21 and the plane of the supporting belts or the travelling plane of the traction member 1. An end piece 30 is vulcanized to the bottom wall 24 of each pocket 48 in the area of the fastening face 21 of the transverse members 12 in order to prevent these pockets 48 from being torn out. The stability of the end piece is strengthened by steel reinforcements. The end piece 30 is formed with blind bores 31 corresponding in number to that of the screw bolts 23, 37 which project out of the fastening face 21, and also the front and rear ends 45, 46 of the bottom wall 24, as seen in conveying direction, are provided with corresponding assembly holes 47. Hereby each front end 45 of a pocket 49, in conveying direction, can be threaded on the fastening bolts 23, 37 together with the rear end 46 of the preceding pocket 48 for subsequent securing by nuts. To this end the screw bolts 23, 37 each are formed with a thread and the nuts are received in the blind bores 31. At its inwardly directed end portion, the reinforcing end piece 30 tapers towards the surface of the bottom wall 24 so as to warrant unobstructed flow of the bulk material when the pocket 48 is emptied. Also the free terminal region 34 of the end piece 30 projecting outwardly beyond the transverse member 12 serves for guidance of the bulk material as it is delivered into the discharge chute 15. In a preferred embodiment this terminal region 34 even protrudes beyond the first folded portion 27 of the sidewalls 25, 26. In this manner any remaining bulk material is prevented from falling down. On the whole, the end piece 30 which resists bending makes sure that the pockets 48 or their bottom wall 24 are disposed at a certain predeterminable inclination with respect to the traction member 1. In this manner a guide surface is provided for the bulk material which will deliver the material into the pocket 48 while making maximum use of the pocket volume. The triangular configuration of the transverse members 12 further provides a guide surface 35 which is constituted by the triangle surface opposite the fastening face 21. This guide surface 35 makes sure that the bulk material is fed properly into the pocket 48 also in this area and that no bulk material is left lying around between adjacent pockets 48, 49.

FIG. 4 once again makes it clear that the sidewalls 25, 26, of which only sidewall 26 is shown here, are subdivided into two folded portions 27, 28. The first folded portion 27 is shaped like a fan and arranged at the contact side 43 of the traction member 1, while the second folded portion 28 is folded in corrugated fashion, the folds being oriented parallel to the traction member 1 and disposed at the carrying side 44 of the traction member 1.

Figure 5:
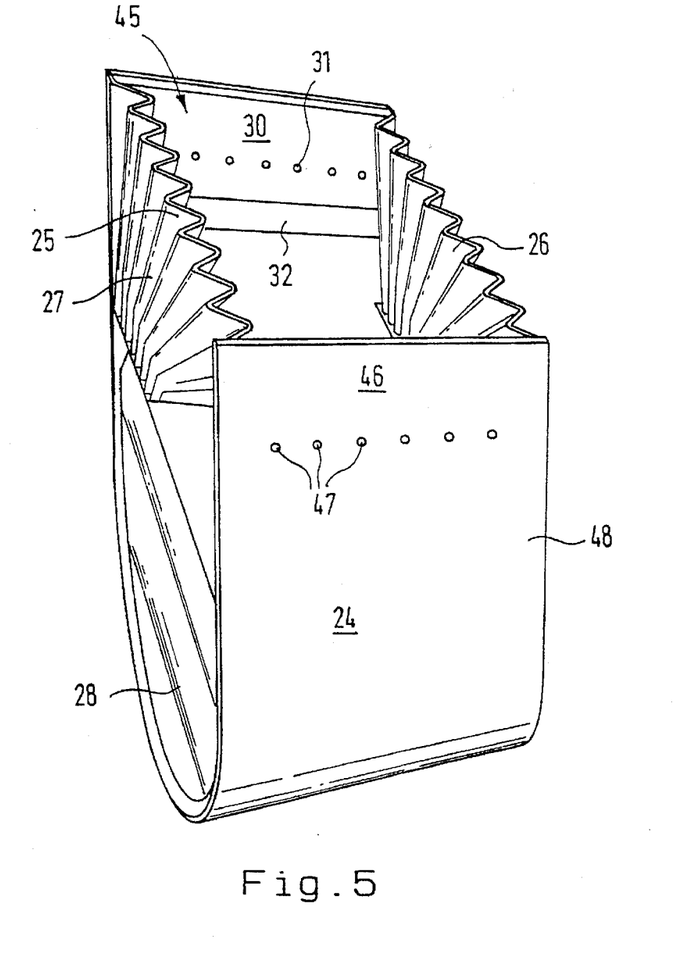
FIG. 5 is a perspective view of an individual pocket of the pocket belt conveyor.

The folded portions of the sidewalls 25, 26 of each pocket 48 are particularly evident from FIG. 5 which presents an individual pocket 48 as it is hooked up in the traction member 1 or the supporting belts 8, 10. The first folded portion 27 extending at the contact side of the traction member 1, in this first embodiment, permits compression of the sidewalls 25, 26 upon movement around the drive pulleys 2 or deviator pulleys 4 and expansion of the sidewalls 25, 26 upon movement around the deflection pulleys 6. The second folded portion 28 of this embodiment is disposed at the carrying side of the traction member 1 and includes corrugations which, being approximately parallel to the traction member 1, are unsymmetric with respect to the plane of the supporting belts and preferably shaped like a sawtooth profile. The corrugations of the second folded portion 28 permit the sidewalls 25, 26 and thus the pockets 48 to be compressed in radial direction upon movement around the pulleys 2, 4, 6. That is necessary when the pulleys are being passed because the pocket configuration must adapt to the curvature caused by the deviating movement of the traction member 1. In this context the unsymmetric corrugation of the sidewalls 25, 26 in their second folded portion 28 contributes to the ease of discharging the bulk material. The preferably chosen sawtooth profile of the corrugations of the second folded portion 28 makes sure that no bulk material is left behind in the corrugations so that residual material cannot accumulate in the corrugations.

FIG. 5 further clearly demonstrates once more that both the front end 45 of the bottom wall 24, in conveying direction, and the rear end 46 are formed with the assembly holes 47 and the blind bores 31, respectively, as regards the end piece 30 applied on the front end 45 of the bottom wall 24, the blind bores 31 being aligned with the assembly holes 47 in the front end 45 in conveying direction. The pocket 48 is suspended between two adjacent transverse members 12, 13 by these assembly holes 47 and blind bores 31, the front end 45 of a pocket 48, in conveying direction, being threaded on the screw bolts 23, 37 which project vertically out of the fastening face 21 of the respective transverse member 12 which is leading in conveying direction, and the rear end 46, in conveying direction, being threaded on the same screw bolts 23, 37 of the next successive transverse member 13 (cf. again FIG. 4; the conveying direction is designated by arrow 17 in that fig.).

Figure 6:
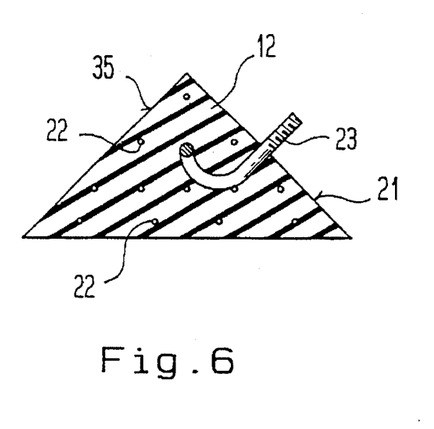
FIGS. 6 and 7 are vertical sections through transverse members of different design.
Figure 7:
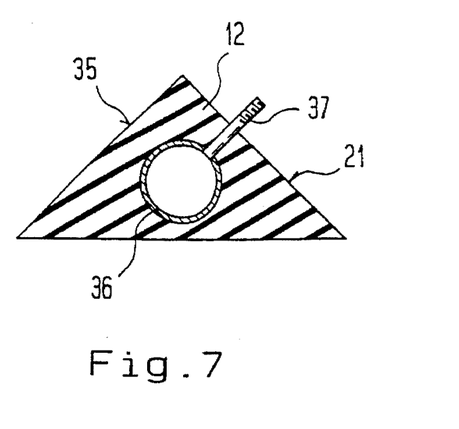

FIGS. 6 and 7 are vertical sectional views of transverse members of different design, but triangular in cross section. FIG. 6 shows the cross section of the transverse member 12 already known from FIG. 4 with U-shaped screw bolts 23 incorporated in it by vulcanization and steel reinforcements 22 likewise vulcanized in the transverse member. FIG. 7 shows an alternative type of reinforcement consisting, in this case, of a steel tube 36 with screw bolts 37, here of rod shape, fixed to the periphery of the steel tube which extends in longitudinal direction throughout the transverse member 12. With both embodiments of the transverse member 12, the threaded ends of the screw bolts 23, 37 project vertically from the fastening face 21 and are stuck through the assembly holes 47 and into the blind bores 31 when the pockets 48 are being mounted.

Figure 8:
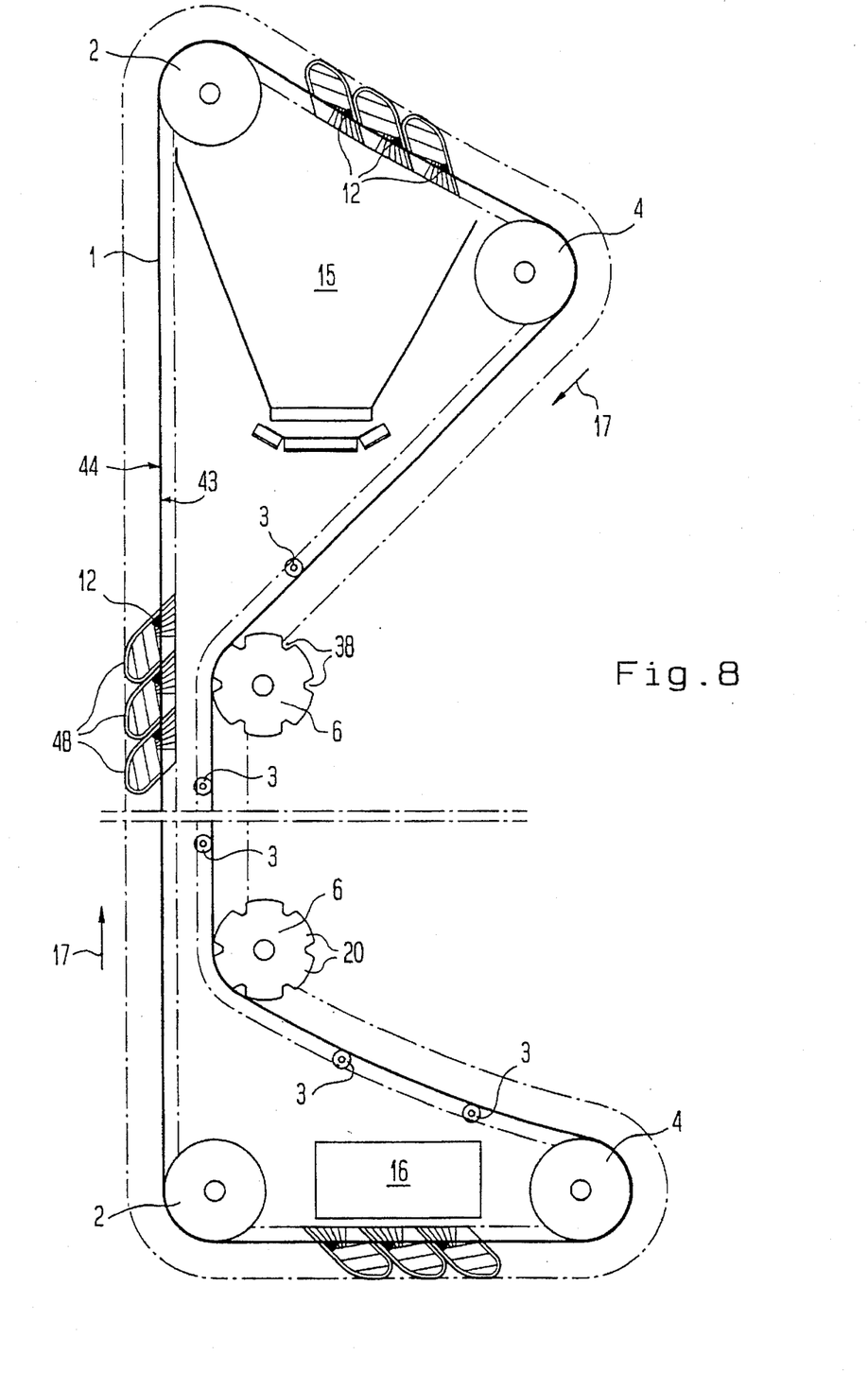
FIG. 8 is a diagrammatic side elevational view of a second embodiment of a pocket belt conveyor according to the invention.

FIG. 8 is a diagrammatic side elevation of a second embodiment of a pocket belt conveyor according to the invention. The difference between this second embodiment and the first one shown in FIG. 1 resides in the fact that the transverse members 12 for securing the pockets 48 are disposed at the carrying side 44 of the traction member 1 or supporting belts 8, 10 in this second embodiment and that the drive pulleys 2 and the deviator pulleys 4 need not be formed with recesses 38, whereas the deflection pulleys 6 are provided with recesses 38 to receive the transverse members 12. Moreover, only two deflection pulleys 6 are provided, instead of the hole series in the first embodiment according to FIG. 1, so that additional vibration dampers 3 are arranged upstream and downstream as well as between the deflection pulleys 6 to dampen vibrations of the traction member 1. With this embodiment, too, the transverse members 12 are cemented to the supporting belts 8, 10. However, additional screw connections may be provided with the supporting belts 8, 10 by way of U-shaped screw bolts embedded in the transverse members 12. Since this involves higher manufacturing cost, an adhesive connection is preferred, all the more so as there are no differences in strength of these connections.

The recesses 38 receive the ends 41, 42 of the transverse members 12 when the supporting belts 8, 10 pass around the deflection pulleys 6, thereby establishing synchronized movement of the supporting belts without transmitting any forces worth mentioning to the two supporting belts 8, 10. The traction member 1 is driven by friction drive effected via the top and bottom drive pulleys 2. Possibly, even one drive pulley 2 may be sufficient. In this case, too, the return run of the pocket belt conveyor is moved close to the forward run by means of the deviator pulleys 4 and the deflection pulleys 6 so as to make it possible to guide the conveyor through a tunnel or have both runs pass along the same track over great distances. That is indicated in the figure by the interrupted presentation of the pocket belt conveyor.

Figure 9:
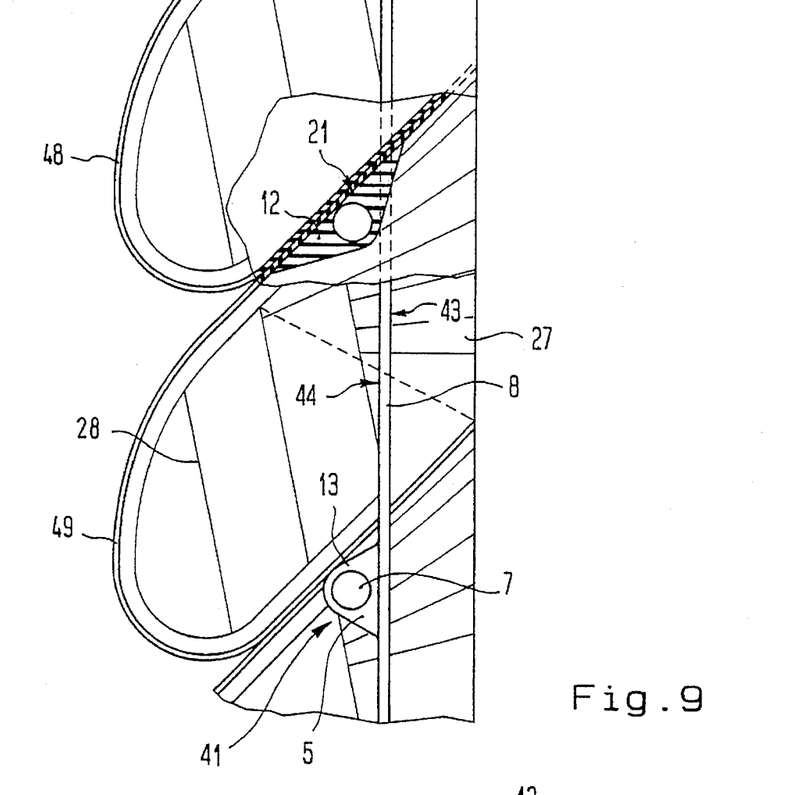
FIG. 9 is a part sectional elevation like (FIG. 4) showing some pockets of the pocket belt conveyor according to FIG. 8.

FIG. 9 shows three adjacent pockets 48 in longitudinal section similar to the presentation of FIG. 4. What is shown here is the attachment of the pockets 48 at the supporting belt 8 by means of transverse members 12 whose ends 41, 42 in this case have a different structure from the ones described above. Here the ends 41, 42 of the transverse members 12 are formed as journals supported for rotation in journal bearings 5 that are mounted on the supporting belts 8, 10. The upper part of FIG. 8 shows the central portion of the transverse member 12 located between the supporting belts 8, 10. Essentially, the transverse member still is triangular in cross section but includes a much enlarged planar fastening face 21 which may be regarded as the hypotenuse of the triangular shape. One half each of two adjacent pockets 48, 49 is attached to this enlarged fastening face 21 in the manner described above with reference to the first embodiment. The enlarged fastening face 21, on the one hand, affords satisfactory attachment of the pockets and, on the other hand, provides good guidance, including an angle of inclination with respect to the plane of the supporting belts.

The lower part of FIG. 9 demonstrates the fastening of a transverse member 13 on the supporting belt 8 by means of a journal bearing 5. The end 41 of the transverse member 13, in the form of a journal, is rotatably received in a bore 7 formed in the journal bearing 5. And the journal bearing 5 is fixed by its flat underside 14 on the carrying side 44 of the traction member 1 or on the supporting belts 8, 10. Otherwise, the pockets 48, 49 again have sidewalls with a first folded portion 27 and a second folded portion 28, the first folded portion 27 being located substantially at the contact side 43 of the traction member 1, while the second folded portion 28 is at the carrying side 44.

Figure 10:
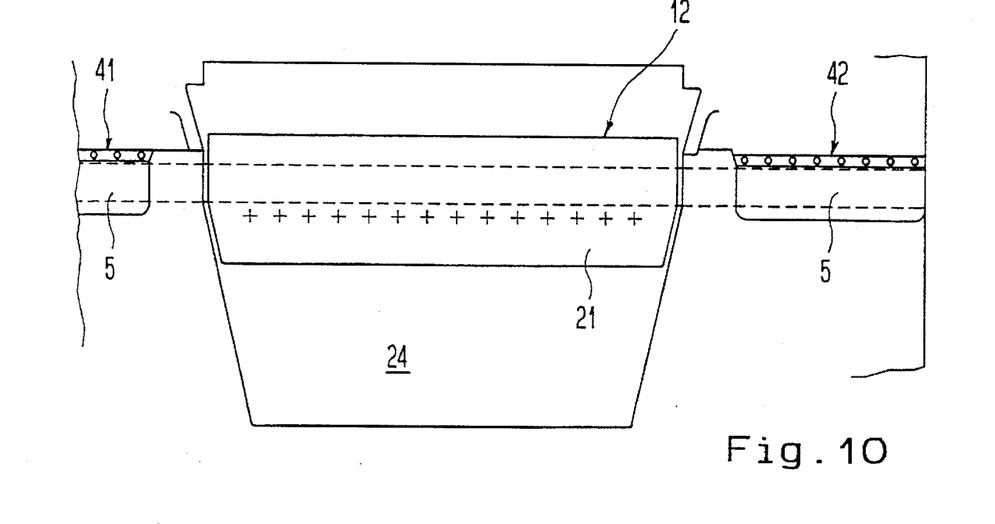
FIG. 10 is a partial top plan view illustrating a possible cross sectional configuration of a transverse member shown in FIG. 9.

FIG. 10 is a partial top plan view showing the attachment of an individual pocket 48 or of the bottom wall 24 thereof at a transverse member 12 which has the varying cross sectional configuration along its length described above with reference to FIG. 8. The drawing clearly shows the enlarged flat fastening face 21 to which the bottom wall 24 of the pocket 48 is attached. At both ends 41, 42, the transverse member 12 is received in journal bearings 5 which in turn are secured on the supporting belts 8, 10, not shown.

Figures 11, 12, 13:
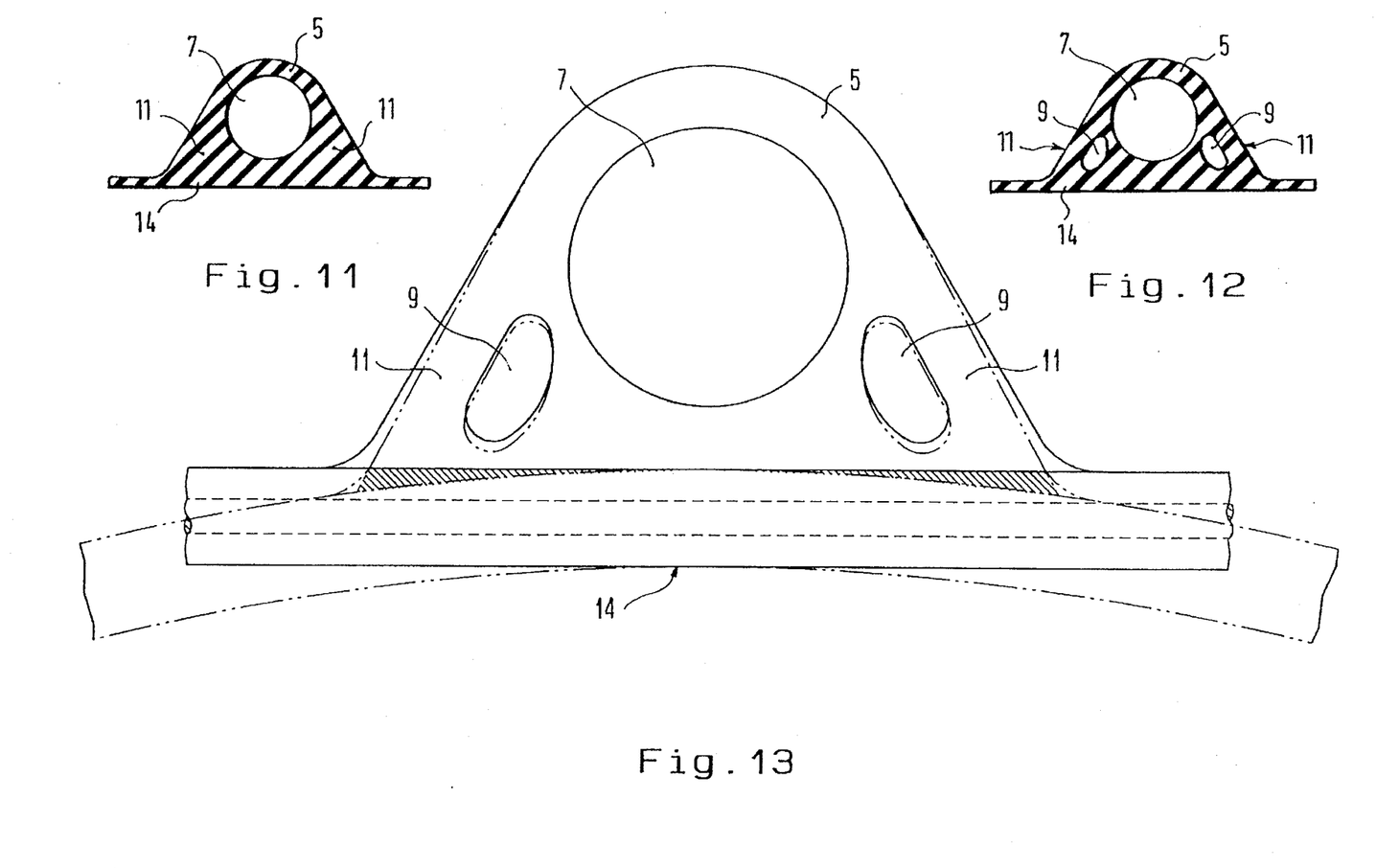
FIGS. 11 and 12 are vertical sections through journal bearings of different design.
FIG. 13 is an enlarged side elevation of the journal bearing shown in FIG. 12, both in normal position and under bending load.

FIG. 11 is a cross sectional view of a journal bearing 5 formed with a bore 7 to receive the journal-type ends 41, 42 of the transverse members 12 and also shows the planar underside 14 which is secured, especially by bonding, to the top of the supporting belts 8, 10. FIG. 12 illustrates a preferred embodiment of the journal bearing 5 formed not only with a bore 7 to receive a journal of a transverse member 12 but also with additional apertures 9 which are located in a region 11 between the bore 7 and the underside 14 of the journal bearing 5. These apertures in the material of the journal bearing 5 make sure that the journal bearing can deform readily upon movement around one of the pulleys 2, 4, 6 so that the great fatigue of the material otherwise experienced can be diminished considerably. The apertures 9 largely accommodate the deformation energy, thereby reducing expansion and tightening of the material of which the journal bearing is made.

The advantage of this modification of the journal bearing 5 presented in FIG. 12 is illustrated in FIG. 13 which shows a journal bearing in straight-running configuration and also in its curved run, the latter in discontinuous lines. This presentation makes it clear that the journal bearing 5 expands considerably in the region 11 between the bore 7 and the underside 14, as it is deflected. Normally this would lead to high stressing of the material in those regions 11. This stress to which the material is subjected is greatly reduced due to the apertures 9. Of course, more apertures 9 or apertures of different shape also may be advantageous.

Figure 14:
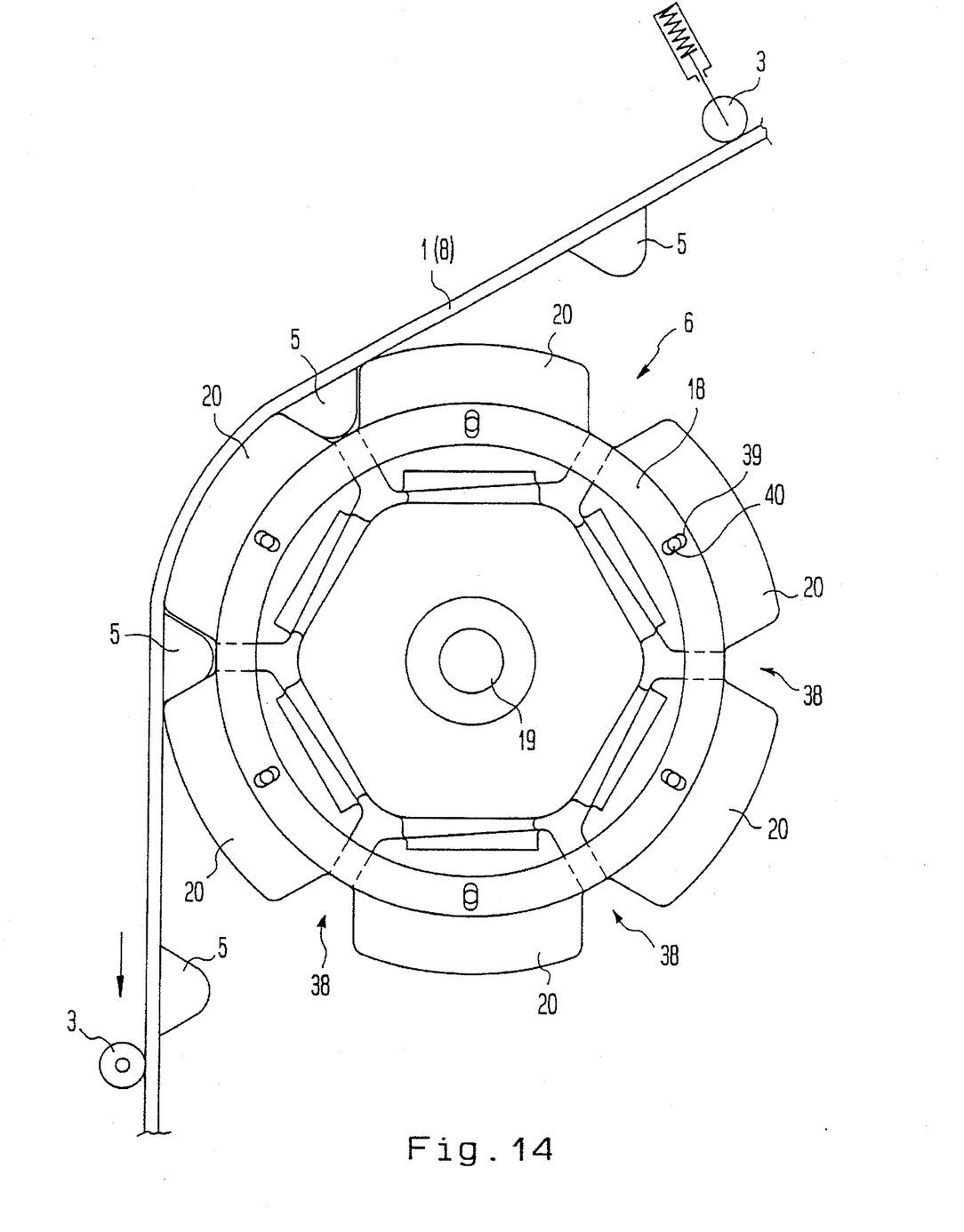
FIG. 14 is a diagrammatic side elevational view of an adjustable deflection pulley.

FIG. 14 is a diagrammatic side elevational view of a deflection pulley 6 and a traction member 1 or supporting belt 8 passing around it. The journal bearings 5 according to the second embodiment of a pocket belt conveyor according to FIG. 8 are disposed at the contact side of the supporting belt 8 and, upon passing of the deflection pulley 6, enter into engagement in the recesses 38. In this case, the recesses 38 are formed between pulley segments 20 which in turn are adjustable radially. To accomplish that, the pulley segments 20 each are guided on an adjustment ring 18 by means of an oblong hole 39 and a bolt 40. In this manner, for instance, they may be moved centrally in radial outward and inward directions. When the pulley segments are shifted outwardly, the circumference of the deflection pulley 6 is increased and, therefore, any slip between the deflection pulley 6, rotating about a hub 19, and the travelling movement of the supporting belt 8 can be compensated. What must be avoided under all circumstances is that the deflection pulley 6 transmits any forces worth mentioning to the journal bearings 5 since that involves the risk of the journal bearings being sheared off the supporting belts 8, 10. The centralized shifting of all pulley segments 20 can be effected in per se known manner by a mechanism built into the hub 19.

Figure 15:
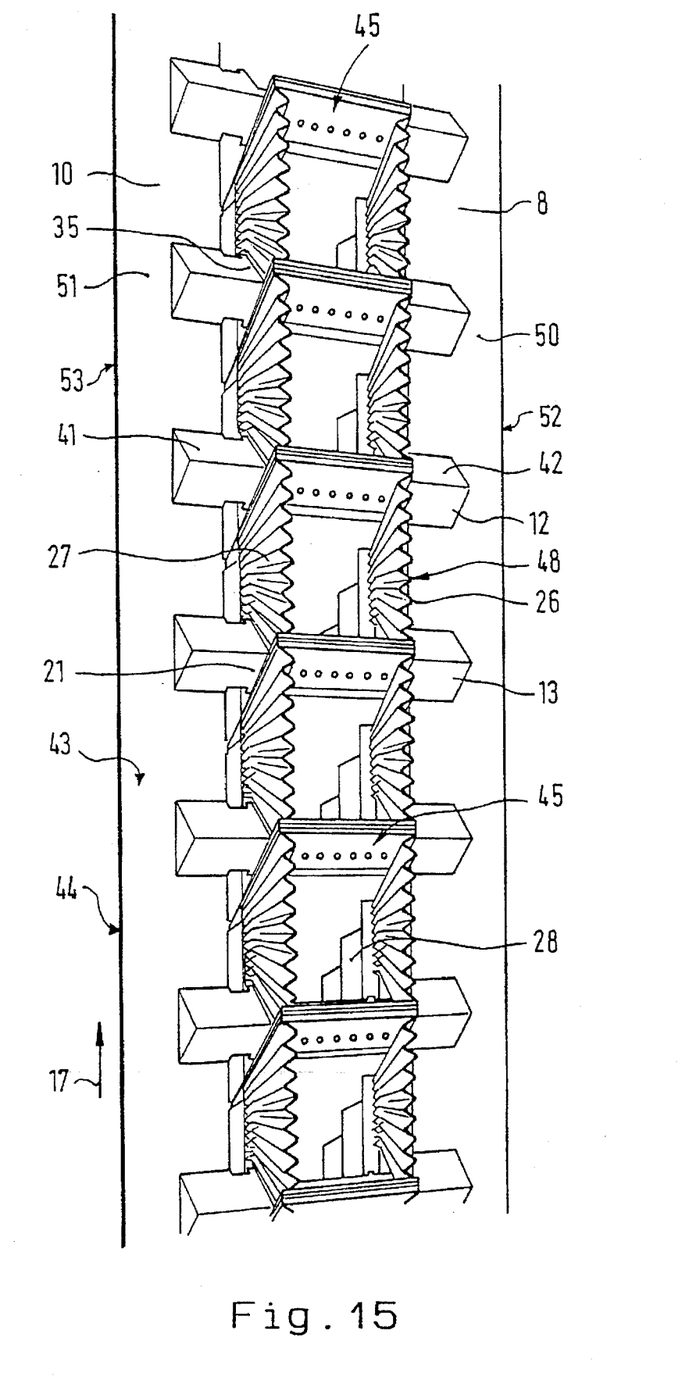
FIG. 15 is a presentation corresponding to FIG. 2, but comprising supporting belts which project laterally beyond the transverse members.

In presenting a third embodiment, FIG. 15 illustrates in a perspective top plan view similar to FIG. 2, a section of the pocket belt conveyor according to the first embodiment with which the transverse members 12, 13 are arranged at the contact side 43 of the supporting belts 8, 10. However, in this figure a very advantageous change was made in the fixing of the transverse members 12, 13 on the supporting belts 8, 10. Here, the supporting belts 8, 10 project beyond the ends 41, 42 of the transverse members 12, 13 in a direction tranversely of the longitudinal extension of the conveyor belt so that the supporting belts 8, 10 now have free marginal strips 50, 51 via which the friction drive of the supporting belts 8, 10 is accomplished without any engagement of the transverse members 12, 13 in the drive pulleys 2. The width of the marginal strips in relation to the width of that region in which the transverse members are fixed on the supporting belts 8, 10, of course, can be adapted to the particular circumstances. In the extreme case, the marginal strips 50, 51 can be made so wide that rather the fastening area of the transverse members 12, 13 should be called "marginal strip". This alternative has the advantage that the transverse members 12, 13 can be disposed at the contact side 43 without causing any problems in terms of slip between the drive pulleys 2 and the supporting belts 8, 10 or the problems known from chain and sprocket drives. If the supporting belts 8, 10 are formed with marginal strips 50, 51, of course, it is not necessary to provide the recesses 38 described above in the drive pulleys 2 or deviator pulleys 4.

What is claimed is:

1. A pocket belt conveyor comprising an endless traction member (1) guided around drive pulleys, deviator pulleys, and deflection pulleys (2, 4, 6) and including at least two generally parallel spaced apart supporting belts (8, 10) having between them a plurality of mutually spaced transverse members (12), further comprising pockets (48) each formed with a bottom wall (24) made of rubber or rubber-like material and extending between two adjacent transverse members (12) characterized in that the transverse members (12) have a planar fastening face (21) for attaching the bottom wall (24) and which extends at an angle with respect to a supporting belt plane.

2. The pocket belt conveyor as claimed in claim 1, characterized in that the transverse members (12) are triangular in cross section.

3. The pocket belt conveyor as claimed in claim 1, characterized in that the transverse members (12) have a relatively smaller cross section in a region between the supporting belts than at ends thereof.

4. The pocket belt conveyor as claimed in claim 1, characterized in that both ends of the transverse members (12) are formed as journals which are rotatably supported in journal bearings (5) mounted on the supporting belts (8, 10).

5. The pocket belt conveyor as claimed in claim 4, characterized in that each journal bearing (5) comprises a bore (7) which receives a journal of the transverse member (12) and at least one aperture (9) located in a region (11) between the bore (7) and an underside (14) of the journal bearing (5).

6. The pocket belt conveyor as claimed in claim 1, characterized in that the transverse members (12) are provided with reinforcing means (22).

7. The pocket belt conveyor as claimed in claim 1, characterized in that fastening means (23, 37) are provided by securing the bottom wall (24) of each pocket (48) to the planar fastening face (21) of the associated transverse member (12).

8. The pocket belt conveyor as claimed in claim 1, characterized in that, as seen in conveying direction (17), a rear end (46) of the bottom wall (24) of a pocket (48) and a front end (45) of the bottom wall (24) of an adjacent successive pocket (49) are secured in overlying relationship to each fastening face (21).

9. The pocket belt conveyor as claimed in claim 1, characterized in that the pockets each have opposite sidewalls (25, 26) and the fastening face (21) is formed with grooves (29) serving to receive a portion of the sidewalls (25, 26) of the pockets (48).

10. The pocket belt conveyor as claimed in claim 1, characterized in that the pockets (48) are U-shaped in cross section, the bottom wall (24) being transversely stiff, and the pockets each include opposite sidewalls (25, 26) between which the bottom wall (24) is disposed.

11. The pocket belt conveyor as claimed in claim 1, characterized in that each pocket (48) includes an end piece (30) of rubber or rubber-like material which is vulcanized to the bottom wall (24) and strengthened by steel reinforcements.

12. The pocket belt conveyor as claimed in claim 11, characterized in that the end piece (30) of each pocket projects above the fastening face (21) of the transverse member (12) to which the pocket is attached.

13. The pocket belt conveyor as claimed in claim 1, characterized in that the transverse members (12) only partly cover the supporting belts (8, 10) in a direction transversely of the conveying direction (17) so that a free marginal strip (50, 51) is formed between the ends (41, 42) of the transverse members (12) and the outer edge (52, 53) of the supporting belts (8, 10).

14. A pocket belt conveyor comprising an endless traction member (1) guided around drive pulleys and deviator pulleys and further comprising a plurality of pockets (48) fastened to the traction member (1), characterized in that sidewalls (25, 26) of the pockets (48) each include a first folded portion (27) disposed on one side of the traction member and a second folded portion (28) disposed on the other side of the traction member, said first folded portion (27) having a fan-like configuration and being disposed at the inner side of the traction member (1) and said second folded portion (28) including corrugations which extend parallel with the traction member (1) and which are disposed at the side of the traction member (1) facing outwardly.

15. The pocket belt conveyor as claimed in claim 14, characterized in that the corrugations of the second folded portion (28) are of sawtooth shape.

16. The pocket belt conveyor as claimed in claim 14, characterized in that the fan-like configuration of the first folded portion (27) defines folds which extend generally perpendicular to the traction member (1).

17. The pocket belt conveyor as claimed in claim 14, characterized in that the drive pulleys (2) are formed in their circumferences with recesses (38) to receive the ends of the transverse members (12).

18. The pocket belt conveyor as claimed in claim 17, characterized in that the recesses (38) are formed between pulley segments (20) which are radially adjustable.

* * * * *